US006504839B2

(12) United States Patent
Valentine et al.

(10) Patent No.: US 6,504,839 B2
(45) Date of Patent: *Jan. 7, 2003

(54) APPARATUS, METHODS AND SYSTEMS FOR ROUTING INFORMATION FROM A PACKET-SWITCHED NETWORK TO A MOBILE DEVICE COMMUNICATING WITH A WIRELESS TELECOMMUNICATIONS NETWORK

(75) Inventors: Eric Valentine, Plano, TX (US); David Boltz, Garland, TX (US)

(73) Assignee: Ericsson Inc., Plano, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/217,868

(22) Filed: Dec. 21, 1998

(65) Prior Publication Data

US 2002/0075846 A1 Jun. 20, 2002

(51) Int. Cl.$^7$ .......................... H04L 12/66; H04L 12/28; H04Q 7/00
(52) U.S. Cl. .......................... 370/354; 370/401; 370/328
(58) Field of Search ................................. 370/352, 353, 370/354, 356, 493, 316, 329, 349, 401, 389, 338, 494, 400, 328

(56) References Cited

U.S. PATENT DOCUMENTS

| | | | | |
|---|---|---|---|---|
| 5,590,133 A | * | 12/1996 | Billstrom et al. | 370/349 |
| 5,943,399 A | * | 8/1999 | Bannister et al. | 370/493 |
| 5,946,615 A | * | 8/1999 | Holmes et al. | 455/412 |
| 6,044,070 A | * | 3/2000 | Valentine et al. | 370/316 |
| 6,088,594 A | * | 7/2000 | Kingdon et al. | 455/457 |
| 6,122,263 A | * | 9/2000 | Dahlin et al. | 370/329 |
| 6,141,545 A | * | 10/2000 | Begeja et al. | 455/417 |
| 6,167,040 A | * | 12/2000 | Haeggstrom | 370/352 |
| 6,167,248 A | * | 12/2000 | Hamalainen et al. | 370/338 |
| 6,201,965 B1 | * | 3/2001 | Mizell et al. | 455/433 |
| 6,236,653 B1 | * | 5/2001 | Dalton et al. | 370/352 |
| 6,246,758 B1 | * | 6/2001 | Low et al. | 370/352 |

* cited by examiner

Primary Examiner—Kwang Bin Yao
Assistant Examiner—Hanh Nguyen
(74) Attorney, Agent, or Firm—Roger S. Burleigh

(57) ABSTRACT

Apparatus, methods and systems for routing information from a packet-switched network to a mobile device communicating with a wireless telecommunications network, wherein a call request for a mobile device is received from the packet-switched network at a first node of the wireless telecommunications network; a determination is made of the serving node of the wireless telecommunications network in communication with the mobile device and whether the serving node is coupled to the packet-switched network; and the call request is redirected to the serving node in response to an affirmative indication that the serving node is coupled to the packet-switched network. Alternatively, in response to a negative indication that the serving node is coupled to the packet-switched network, the call request is routed from the first node to the serving node through a circuit-switched network coupled intermediate to the first node and the serving node. The packet-switched network may be a network employing, for example, the Internet Protocol (IP), and the circuit-switched network may, be the Public Switched Telephone Network (PSTN), whereby calls originating from devices coupled to the Internet, or similar network, can be directly routed to a serving node of the wireless telecommunications network in communication with the mobile device or, alternatively, through the PSTN. In a conventional Public Land Mobile Network (PLMN), the first node of the wireless telecommunications network can be a Gateway Mobile-Services Switching Center (GMSC) and the serving node of the wireless telecommunications network in communication with the mobile device can be a Mobile-Services Switching Center (MSC).

26 Claims, 4 Drawing Sheets

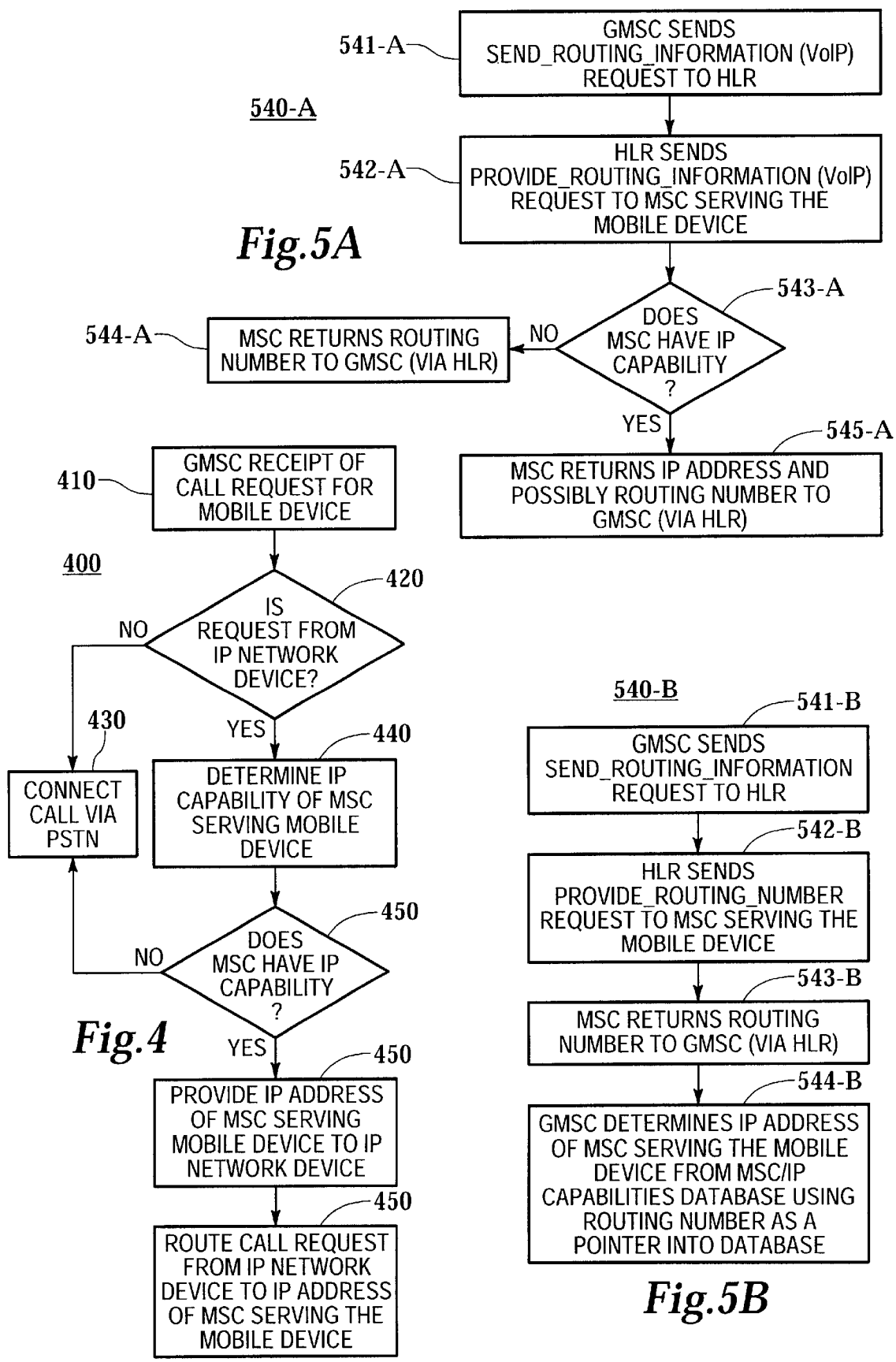

APPARATUS, METHODS AND SYSTEMS FOR ROUTING INFORMATION FROM A PACKET-SWITCHED NETWORK TO A MOBILE DEVICE COMMUNICATING WITH A WIRELESS TELECOMMUNICATIONS NETWORK

TECHNICAL FIELD OF THE INVENTION

The present invention is directed, in general, to wireless communications systems and, more specifically, to apparatus or methods to route information from a packet-switched network to a mobile device communicating with a wireless telecommunications network.

BACKGROUND OF THE INVENTION

The world is currently experiencing revolutionary changes in communication systems, brought about by the general availability of access to the Internet as well as wireless telephony. In particular, interest in Internet Protocol (IP) telephony, or Voice over IP (VoIP), has expanded rapidly as the associated technologies have matured. Interoperability is a prominent factor in the success of Internet telephony. The creation of the International Telecommunications Union (ITU) Recommendation H.323 is one step to ensure such interoperability.

Recommendation H.323 describes the technical requirements for multimedia communications services in a packet-switched network, such as the communication of audio, video and data over the conventional Internet. Packet-switched networks, however, may also include private and public local area networks (LANs), wide-area networks (WANs), and point-to-point dial-up connections over point-to-point protocol (PPP) or other packet-switched protocols. The advent of IP telephony allowing phone calls across packet-switched networks triggered a revolution in the telecommunications industry. Early IP telephony, however, had many limitations that prevented it from becoming a mainstream telephony service. One of the biggest problems was a lack of connectivity between an IP telephony network and the public switched telephone network (PSTN). This led to the development of a gateway that allows IP and PSTN customers to communicate with each other; such communications, however, have conventionally required the routing of information between IP and PSTN customers through the circuit-switched network of the PSTN.

The telecommunications industry has also recently undergone a revolution in the area of wireless telephony; e.g., "cellular" or "mobile" devices. Wireless telecommunications networks are an adjunct to the PSTN, and depend upon the circuit-switched network of the PSTN for communications with conventional wired telephony devices as well as with mobile devices. Thus, the routing of information to a mobile device communicating with a wireless telecommunications network has heretofore also required all such information to be routed through the PSTN.

Because of the proliferation of IP telephony and mobile devices, there is a need in the art for apparatus, methods and systems for efficiently routing information from a packet-switched network to a mobile device communicating with a wireless telecommunications network. Because both IP telephony and mobile devices currently depend upon the circuit-switched network of the PSTN, even greater demand will be placed on the PSTN as IP telephony and mobile device capabilities and services continue to expand. Accordingly, there is a particular need in the art for apparatus, methods and systems for routing information between IP telephony and mobile devices that do not require use of the circuit-switched network of the PSTN.

SUMMARY OF THE INVENTION

To address the above-discussed deficiencies of the prior art, the present invention relates to apparatus, methods and systems for routing information from a packet-switched network to a mobile device communicating with a wireless telecommunications network. In one embodiment of a wireless telecommunications system employing the principles of the invention, a call request for a mobile device is received from the packet-switched network at a first node of the wireless telecommunications network; a determination is made of the serving node of the wireless telecommunications network in communication with the mobile device and whether the serving node is coupled to the packet-switched. network; and the call request is redirected to the serving node in response to an affirmative indication that the serving node is coupled to the packet-switched network. Alternatively, if the serving node is not coupled to the packet-switched network, the call request is routed from the first node to the serving node through a circuit-switched network coupled intermediate to the first node and the serving node.

In various embodiments, the determination of the serving node of the wireless telecommunications network in communication with the mobile device is accomplished by (i) sending an inquiry to a location resource of the wireless telecommunications network, wherein the inquiry includes a unique identifier of the mobile device, such as the Mobile Station Integrated Service Digital Network (MSISDN) number identifying the mobile subscriber or device; and (ii) querying a database in the location resource using the unique identifier, wherein the database includes an association between the unique identifier and the serving node of the wireless telecommunications network in communication with the mobile device.

Once the serving node of the wireless communications network in communication with the mobile device has been identified, it is then determined whether that serving node is coupled to the packet-switched network. In one embodiment, the inquiry sent to the location resource includes an indicator that the call request for the mobile device is from the packet-switched network. The location resource then sends a request for routing information to the serving node of the wireless telecommunications network in communication with the mobile device; the request for routing information includes an indicator that the call request for the mobile device is from the packet-switched network. The serving node then transmits a response to the request for routing information to the location resource; the response includes the unique address of the serving node on the wireless telecommunications network. The response also includes an address of the serving node on the packet-switched network if it is coupled to that network. If the serving node is coupled to the packet-switched network, the call request is redirected to the serving node. Alternatively, if the serving node is not coupled to the packet-switched network, the call request is routed from the first node to the serving node through the circuit-switched network coupled intermediate to the first node and the serving node.

In an alternate embodiment, conventional signaling can be employed between the first node, location resource and serving node to return the unique address of the serving node on the wireless telecommunications network to the first node. The determination of whether the serving node is coupled to the packet-switched network is then accomplished by querying a database using the unique address of the serving node on the wireless telecommunications network; the query returns an address of the serving node on the packet-switched network if the database identifies that the serving node is coupled to the packet-switched network. If the serving node is coupled to the packet-switched network, the call request is redirected to the address of the serving node on the packet-switched network. Alternatively, if the serving node is not coupled to the packet-switched network, the call request is routed from the first node to the serving node through the circuit-switched network coupled intermediate to the first node and the serving node.

The principles of the present invention may be employed to advantage in combinations of various packet-switched and wireless communication network topologies. The packet-switched network may be, for example, the Internet and the circuit-switched network may be the Public Switched Telephone Network (PSTN), whereby calls originating from devices coupled to the Internet, or similar network, can be directly routed to a serving node of the wireless telecommunications network in communication with the mobile device or, if the serving node is not coupled to the Internet, such calls can be routed through the PSTN. If the packet-switched network is the Internet, the address of the serving node is preferably an Internet Protocol (IP) address; as used herein, "IP address" is defined to include a basic IP address, a "socket," which comprises an IP address plus a port number, and an IP address plus any other data used to identify a transaction or process associated with the IP address. If the present invention is employed in a conventional Public Land Mobile Network (PLMN), the first node of the wireless telecommunications network can be a Gateway Mobile-Services Switching Center (GMSC), the serving node of the wireless telecommunications network in communication with the mobile device can be a Mobile-Services Switching Center (MSC), and the location resource can be a Home Location Register (HLR). Those skilled in the art will readily conceive of other packet-switched and wireless communication network topologies that may advantageously employ the principles of the invention; such applications of the invention are intended to be within the scope of the claims recited hereinafter.

As described more fully hereinafter, the present invention provides various apparatus, methods and systems for routing information from a packet-switched network to a mobile device communicating with a wireless telecommunications network. Instead of always routing such information through a circuit-switched network associated with the wireless telecommunications network, the present invention redirects a call request for a mobile device to the serving node of the wireless communications network in communication with the mobile device if the serving node is coupled to the packet-switched network, thereby bypassing the circuit-switched network.

The foregoing has outlined, rather broadly, the principles of the present invention so that those skilled in the art may better understand the detailed description of the exemplary embodiments that follow. Those skilled in the art should appreciate that they can readily use the disclosed conception and exemplary embodiments as a basis for designing or modifying other structures and methods for carrying out the same purposes of the present invention. Those skilled in the art should also realize that such equivalent constructions do not depart from the spirit and scope of the invention in its broadest form, as delimited by the claims recited hereinafter.

BRIEF DESCRIPTION OF THE DRAWINGS

For a more complete understanding of the present invention, reference is now made to the following detailed description taken in conjunction with the accompanying drawings, in which:

FIG. 4 illustrates an exemplary flow diagram of a method for routing information from a packet-switched network to a mobile device communicating with a wireless telecommunications network in accordance with the principles of the present invention;

FIG. 5-A illustrates a first exemplary method for determining whether a serving node of a wireless telecommunications network in communication with a mobile device is coupled to a packet-switched network; and FIG. 5-B illustrates a second exemplary method for determining whether a serving node of a wireless telecommunications network in communication with a mobile device is coupled to a packet-switched network.

DETAILED DESCRIPTION

Figure 1:
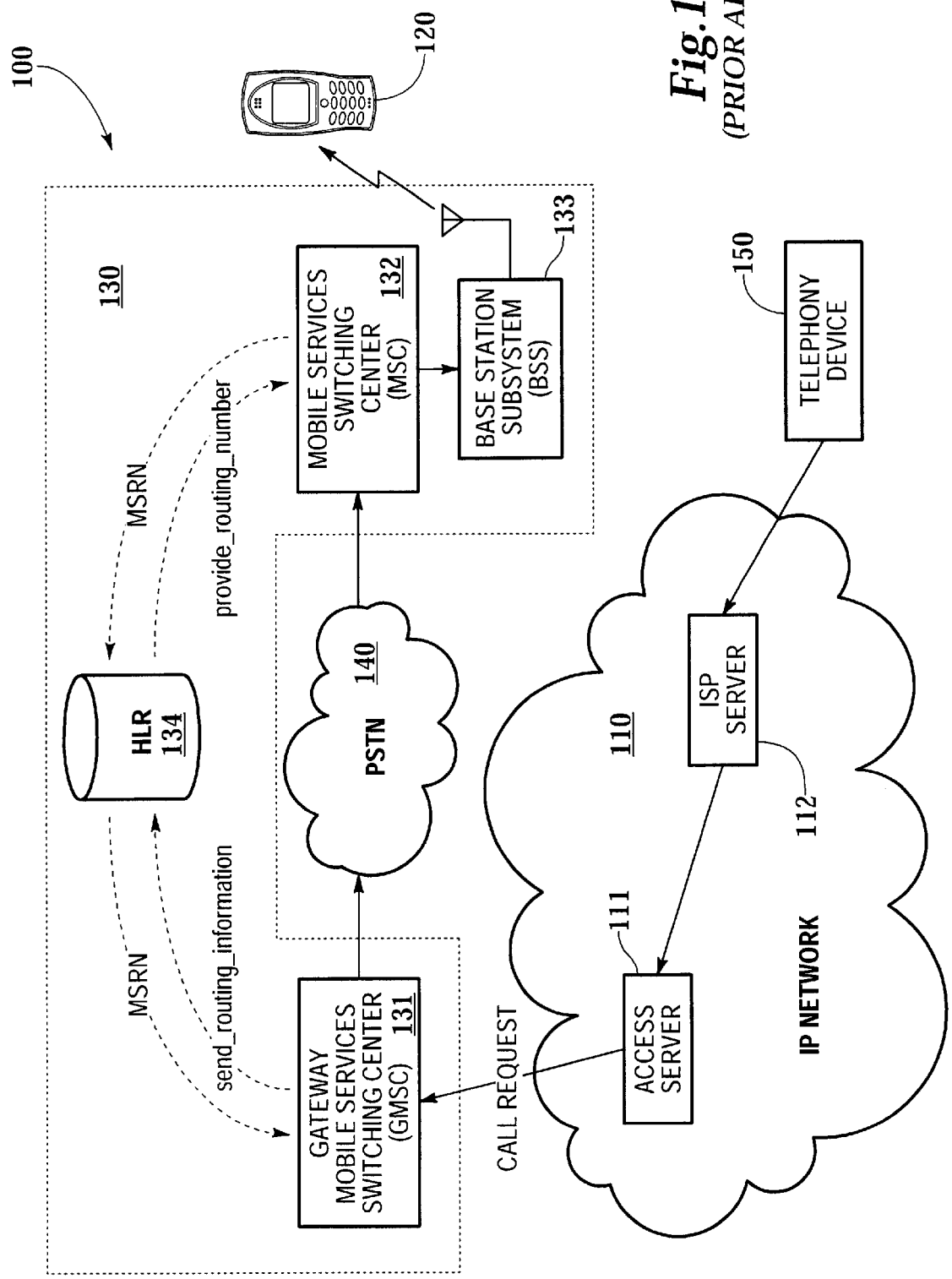
FIG. 1 illustrates a simplified diagram of a prior art system for routing information from a packet-switched network to a mobile device communicating with a wireless telecommunications network.

Referring to FIG. 1, illustrated is a simplified diagram of a prior art system 100 for routing information from a packet-switched network 110 to a mobile device 120 communicating with a wireless telecommunications network 130. The wireless telecommunications network 130, or Public Land Mobile Network (PLMN), conventionally includes a Gateway Mobile-Services Switching Center (GMSC) 131, at least one Mobile-Services Switching Center (MSC) 132 coupled to the GMSC through the Public Switched Telephone Network 140, at least one Base Station Subsystem (BSS) 133 coupled to each MSC 132, and a Home Location Resource (HLR), 134.

A packet-switched network 110, such as the Internet, is coupled to a first node, e.g., GMSC 131, of the wireless telecommunications network 130 through an access server 111. A terminal device 150, such as a personal computer having telephony capabilities, is coupled to a server 112, such as a conventional server of an Internet Service Provider (ISP), on the packet-switched network 110. A call request directed to a mobile device 120 from a terminal device 150 is routed through the packet-switched network 110 from the server 112 to the access server 111, which then transmits the call request to the GMSC 131; the call request includes a unique identifier of the mobile device 120, such as the Mobile Station Integrated Service Digital Network (MSISDN). Typically, communication of a payload (e.g., voice) between the access server 111 and GMSC 131 generally conform to the ITU G.711 (PCM) standard, and signaling conforms, for example, to the ISUP or Q.931 standards; thus, the packet-switched, e.g., Internet Protocol (IP), segment of the call request terminates at the GMSC 131. The GMSC 131 then sends an inquiry, e.g., Send_Routing_Information, to a location resource, e.g., HLR 134, to determine the location of the mobile device 120 having the unique identifier. The HLR 134 queries a database using the unique identifier, wherein the database includes an association between the unique identifier and the serving node, e.g., MSC 132, of the wireless telecommunications network 130 in communication with the mobile device 120. The HLR 134 then sends a request, e.g., Provide_Routing_Number, to the MSC 132 to obtain a routing number, e.g., a Mobile Subscriber Routing Number (MSRN), for the mobile device 120. The MSC 132 responds to the Provide_Routing_Number request by sending the MSRN to the HLR 134, which then sends the MSRN back to the GMSC 131. The GMSC 131 then uses the MSRN to route the call request to the MSC 132 through the PSTN 140, and the MSC 132 completes the call to the mobile device 120 through the proper BSS 133 in communication with the mobile device 120.

Thus, the conventional method for routing call requests, such as H.323 calls, from a packet-switched network, such as the Internet, to a mobile device 120 terminates the packet-switched, or IP, segment of the request at the first node, e.g., GMSC 131, of the wireless telecommunications network 130. The remainder of the connection, from the GMSC 131 to the MSC 132, is carried over a circuit-switched network, such as the PSTN 140. This is not an efficient use of network resources because only a negligible quality loss would be incurred by taking the IP traffic all the way to the MSC 132. In addition, because the routing of calls through the PSTN 140 is typically charged to the operator of the wireless telecommunications network 130 or the subscriber of the mobile device 120, the conventional method results in extra transmission expenses either for the operator or subscriber.

Figure 2:
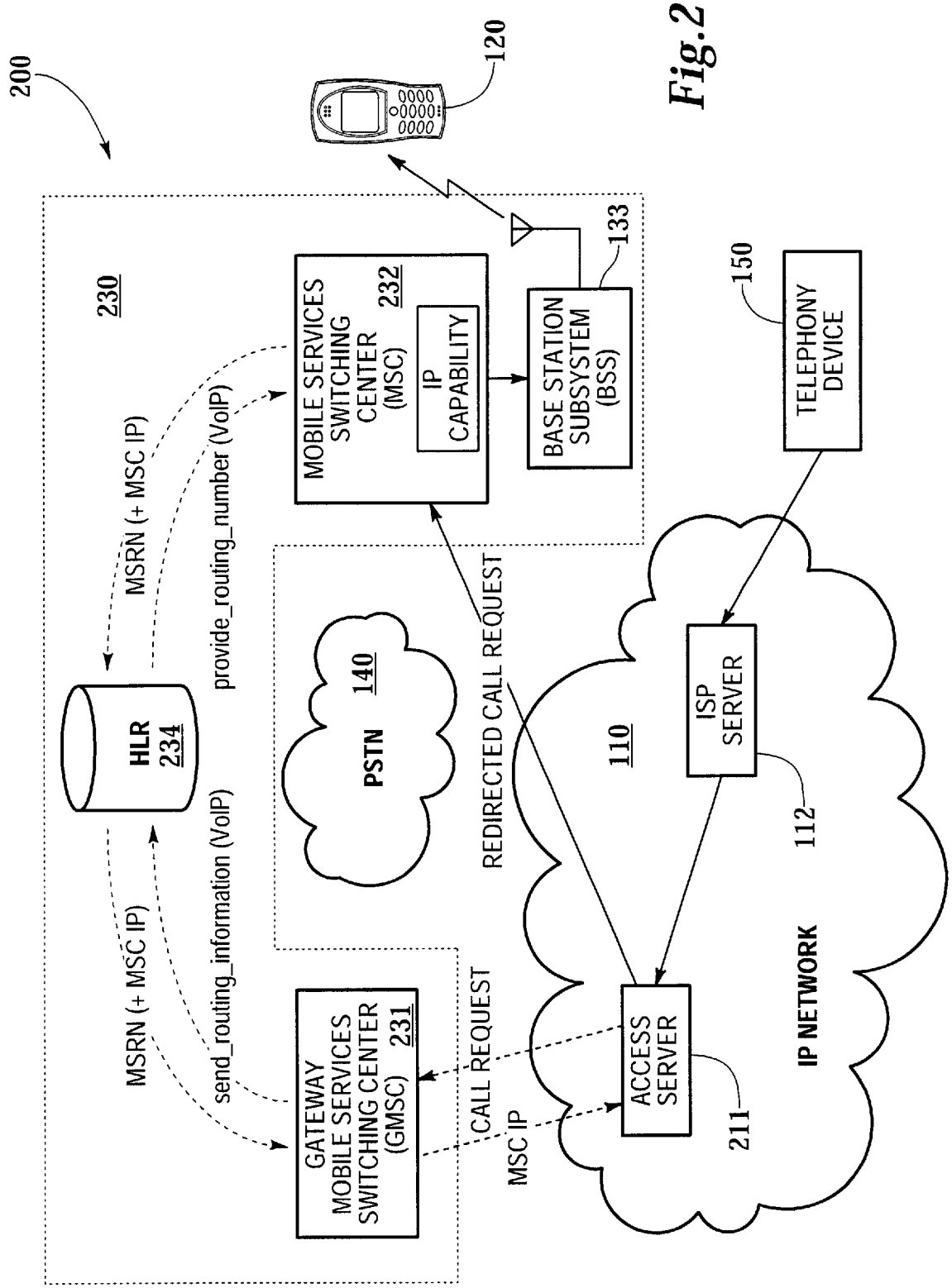
FIG. 2 illustrates a simplified diagram of a first exemplary system for routing information from a packet-switched network to a mobile device communicating with a wireless telecommunications network in accordance with the principles of the present invention.

Referring now to FIG. 2, illustrated is a simplified diagram of a first exemplary system 200 for routing information from a packet-switched network 110 to a mobile device 120 communicating with a wireless telecommunications network 230 in accordance with the principles of the present invention. According to the principles of the invention, call requests from the packet-switched network 110 can be redirected to a serving node having capability to receive packet-switched data, e.g., MSC 232 with IP capability, thereby bypassing the circuit-switched network, e.g., PSTN 140, and thus overcoming the disadvantages of the prior art method of routing such call requests. Those skilled in the art are familiar with means for providing communications between an MSC and an IP network and, thus, a detailed description of such means is unnecessary to an understanding of the present invention.

In the first exemplary system 200, the MSC 232 is provided with the capability to receive call requests from the packet-switched network 110. This can be accomplished by providing the MSC 232 with the capability to receive packet-switched, e.g., IP, traffic. In other words, call requests can be redirected from the packet-switched network 110 to an MSC 232 having IP capability, either by providing a link between an access server in the packet-switched network 110 and the MSC 232 or by locating an access server of the packet-switched network 110 directly in the MSC 232. Because the wireless telecommunications network 230 typically has many MSCs through which the mobile device 120 may be reached, the MSC serving the mobile device 120 at the time of the call request, and whether that MSC has IP capability, must be determined before a call request can be properly redirected.

In the first exemplary system 200, a call request directed to a mobile device 120 from a terminal device 150 is routed through the packet-switched network 110 from the server 112 to the access server 211, which then transmits the call request to the GMSC 231; the call request includes a unique identifier of the mobile device 120, such as the Mobile Station Integrated Service Digital Network (MSISDN). The GMSC 231 then sends an inquiry, including an indication that the call request is from the packet-switched network 110, to a location resource, e.g., HLR 234, to determine the location of the mobile device 120 having the unique identifier; the inquiry may, for example, be of the form Send_Routing_Information (VoIP). The HLR 234 queries a database using the unique identifier, wherein the database includes an association between the unique identifier and the serving node, e.g., MSC 232, of the wireless telecommunications network 130 in communication with the mobile device 120. Once the serving node, e.g., MSC 232, of the wireless communications network 230 in communication with the mobile device 120 has been identified, it is then determined whether that MSC is coupled to the packet-switched network 110.

The HLR 234 sends a request including the VoIP indicator, Provide_Routing_Number (VoIP), to an MSC to obtain a routing number, e.g., a Mobile Subscriber Routing Number (MSRN), for the mobile device 120. An MSC responds to a Provide_Routing_Number (VoIP) request by sending a MSRN to the HLR 234, which then sends the MSRN back to the GMSC 231. In addition, if the MSC receiving the Provide_Routing_Number (VoIP) request has IP capability, such as MSC 232, the MSC also includes an address, e.g., an IP address, of the MSC on the packet-switched network 110 in the response (MSRN+IP). The HLR 234 then sends the MSRN, and IP address if available, to the GMSC 231. If no IP address for the serving MSC is received by the GMSC 231, the GMSC 231 uses the MSRN to route the call request to the MSC through the PSTN 140. If an IP address for the serving MSC is received by the GMSC 231, however, the IP address is provided to the access server 211, which then redirects the call request to the MSC 232. Those skilled in the art are familiar with means for redirecting data packets on a packet-switched network; for example, a control message can be sent to the access server 211 with a command to redirect all packets associated with the call to an IP address, or a socket, associated with the MSC 232. The MSC 232 completes the call to the mobile device 120 through the proper BSS 133 in communication with the mobile device 120.

Figure 3:
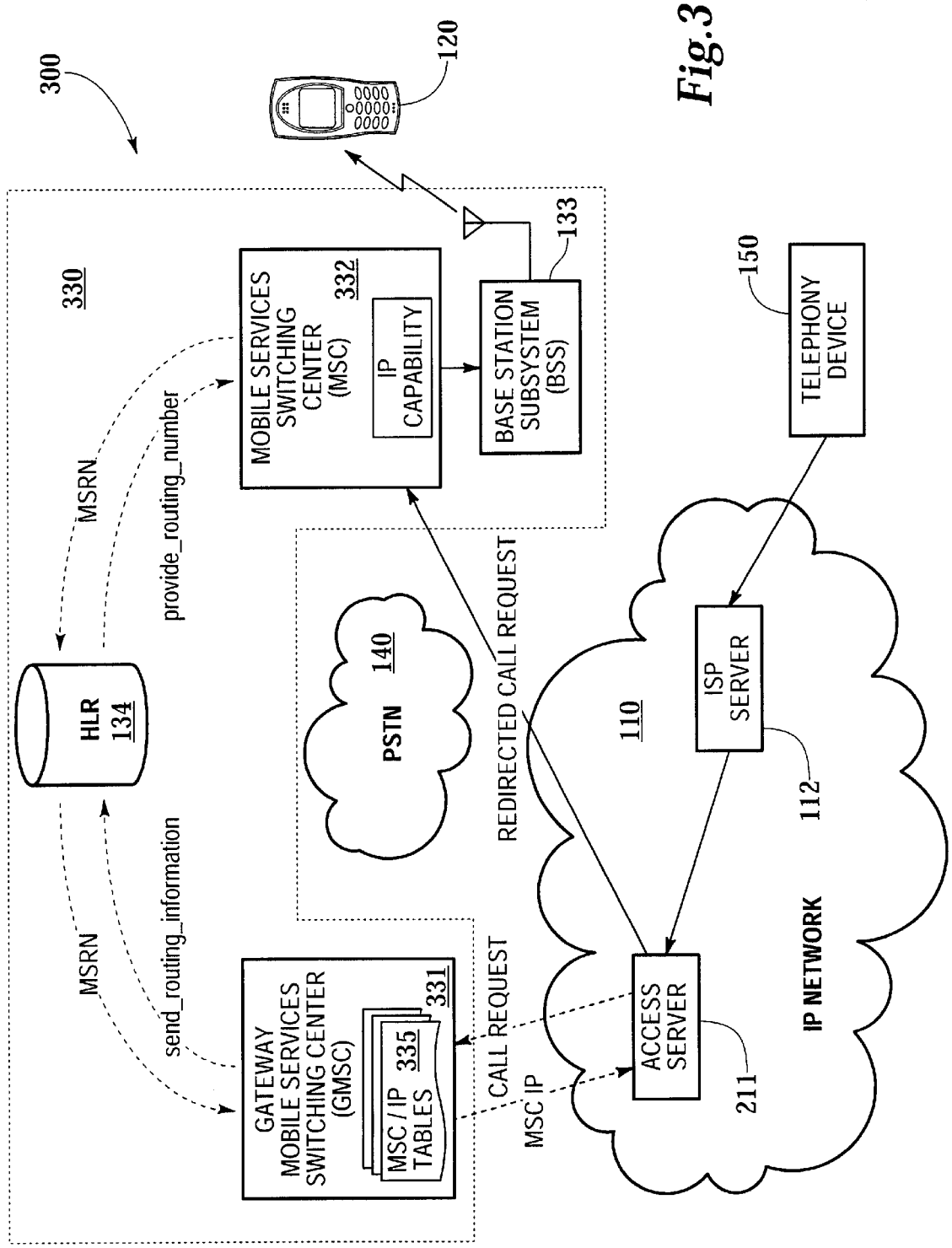
FIG. 3 illustrates a simplified diagram of a second exemplary system for routing information from a packet-switched network to a mobile device communicating with a wireless telecommunications network in accordance with the principles of the present invention.

Referring now to FIG. 3, illustrated is a simplified diagram of a second exemplary system 300 for routing information from a packet-switched network 110 to a mobile device 120 communicating with a wireless telecommunications network 330 in accordance with the principles of the present invention. In this embodiment, conventional signaling can be employed between the first node (e.g., GMSC 331), the location resource (e.g., HLR 134) and the serving node (e.g., MSC 332) to return the unique address of the MSC 332 on the wireless telecommunications network 130 to the GMSC 331; identification can be accomplished by examining the MSRN which, because it is a routable number, uniquely identifies the serving MSC. The determination of whether the MSC is coupled to the packet-switched network 110 is then accomplished by querying a database using the unique address of the MSC on the wireless telecommunications network 330; if the database identifies that the MSC is coupled to the packet-switched network, the query returns a packet routing address, e.g., an IP address, MSC on the packet-switched network 110. If the MSC is coupled to the packet-switched network 110, the call request is redirected to the address of the MSC 332 on the packet-switched network 110. Alternatively, if the MSC is not coupled to the packet-switched network 110, the call request is routed from the GMSC 331 to the MSC through the PSTN 140.

In the second exemplary system 300, a call request directed to a mobile device 120 from a terminal device 150 is routed through the packet-switched network 110 from the server 112 to the access server 311, which then transmits the call request to the GMSC 331; the call request includes a unique identifier of the mobile device 120, such as the Mobile Station Integrated Service Digital Network (MSISDN). The GMSC 331 then sends an inquiry, Send_Routing_Information, to a location resource, e.g., HLR 134, to determine the location of the mobile device 120 having the unique identifier. The HLR 134 queries a database using the unique identifier, wherein the database includes an association between the unique identifier and the serving node, e.g., MSC 332, of the wireless telecommunications network 330 in communication with the mobile device 120. The HLR 134 sends a request, Provide_Routing_Number, to the MSC 332 to obtain a routing number, e.g., a Mobile Subscriber Routing Number (MSRN), for the mobile device 120. An MSC responds to a Provide_Routing_Number request by sending a MSRN to the HLR 134, which then sends the MSRN back to the GMSC 331, whereby the serving node, e.g., MSC 332, of the wireless communications network 330 in communication with the mobile device 120 is identified to the GMSC 331. It is then determined whether that MSC is coupled to the packet-switched network 110.

The determination of whether the MSC is coupled to the packet-switched network 110 is accomplished by querying a database 335 using the unique address of the MSC on the wireless telecommunications network 330; the database 335 comprises tables that associate the unique addresses of the MSCs on the wireless telecommunications network 330 with addresses on the packet-switched network 110. The query returns an address of the MSC on the packet-switched network 110 if the database 335 identifies that the MSC is coupled to the packet-switched network 110. If the MSC is coupled to the packet-switched network 110, the call request is redirected to the address of the MSC 332 on the packet-switched network 110. Alternatively, if the MSC is not coupled to the packet-switched network 110, the IP address for the MSC is provided to the access server 211, which then redirects the call request to the MSC 332. The MSC 332 completes the call to the mobile device 120 through the proper BSS 133 in communication with the mobile device 120.

Turning now to FIG. 4, illustrated is an exemplary flow diagram of a method 400 for routing information from a packet-switched network to a mobile device communicating with a wireless telecommunications network in accordance with the principles of the present invention. In a first step 410, a first node of the wireless telecommunications network, e.g., a GMSC, receives a call request for a mobile device. In a step 420, it is determined whether the call request is from a device coupled to a packet-switched network, e.g., an IP network. If the call request is not from a packet-switched network, the call is routed to the mobile device via a circuit-switched network, such as the PSTN, in a step 430. If the call request is from a packet-switched network, however, the serving node, e.g., an MSC, of the wireless telecommunications network in communication with the mobile device, and whether the MSC has IP capability, is determined in a step 440; alternative methods of making these determinations are described hereinafter with reference to FIGS. 5-A and 5-B. If the MSC in communication with the mobile device does not have IP capability, the call is routed to the mobile device via a circuit-switched network, such as the PSTN, in a step 430. If the MSC does have IP capability, however, the IP address of the MSC is provided to a routing device of the packet-switched network in a step 460, and the call request is then redirected to the IP address of the MSC via the packet-switched network in a step 470.

Referring now to FIG. 5-A, illustrated is a first exemplary method 540-A for determining whether a serving node of a wireless telecommunications network in communication with a mobile device is coupled to a packet-switched network; the first exemplary method 540-A corresponds to, and is preferably employed in, the first exemplary system 200 illustrated in FIG. 2. In a step 541-A, a first node, e.g., a GMSC, of the wireless telecommunications network sends an inquiry, e.g., Send_Routing_Information (VoIP), to a location resource, e.g., an HLR, associated with the wireless telecommunications network; the inquiry includes a unique address of the mobile device, such as a MSISDN, and an indicator that the call request is from a packet-switched network, e.g., a voice over IP.(VoIP) call. In a step 542-A, the HLR queries a database to determine the MSC in communication with the mobile device and then sends a request for a routing number, Provide_Routing_Number (VoIP), that includes an indicator that the call request is from the packet-switched network to that MSC. If the MSC does not have an address on the packet-switched network, the MSC returns only the routing number, which uniquely identifies the MSC in communication with the mobile device to the GMSC in a step 544-A, the routing number can be returned to the GMSC via the HLR. If the MSC does have an address on the packet-switched network, e.g., an IP address, the MSC returns the IP address to the GMSC in a step 545-A; in addition, the MSC can also return the routing number to the GMSC to alternatively allow routing of the call request through the PSTN.

Finally, FIG. 5-B, illustrated is a second exemplary method 540-B for determining whether a serving node of a wireless telecommunications network in communication with a mobile device is coupled to a packet-switched network; the second exemplary method 540-A corresponds to, and is preferably employed in, the second exemplary system 300 illustrated in FIG. 3. In a step 541-B, a first node, e.g., a GMSC, of the wireless telecommunications network sends an inquiry, e.g., Send_Routing_Information, to a location resource, e.g., an HLR, associated with the wireless telecommunications network; the inquiry includes a unique address of the mobile device, such as a MSISDN. In a step 542-B, the HLR queries a database to determine the MSC in communication with the mobile device and then sends a request, Provide_Routing_Number, for a routing number to the mobile device through that MSC. In a step 543-B, the MSC returns the routing number, which uniquely identifies the MSC in communication with the mobile device, to the GMSC; the routing number can be returned to the GMSC via the HLR. In a step 544-B, the GMSC then queries a database, using the routing number as a pointer into the database, to determine whether the MSC identified by the routing number is coupled to the packet-switched network (e.g., whether the MSC has an IP address reachable through the packet-switched network).

The present invention provides significant advantages to wireless communications systems, in general, and the invention is particularly advantageous in wireless communications networks coupled to a packet-switched network, such as the Internet. The principles of the apparatus, methods and systems for routing information from a packet-switched network to a mobile device communicating with a wireless telecommunications network disclosed herein can optimize the routing of call requests from packet-switched networks to mobile devices, while decreasing the utilization of circuit-switched network resources, such as the PSTN.

Although the present invention has been described in detail, those skilled in the art will conceive of various changes, substitutions and alterations to the exemplary embodiments described herein without departing from the spirit and scope of the invention in its broadest form. The exemplary embodiments presented herein illustrate the principles of the invention and are not intended to be exhaustive or to limit the invention to the form disclosed; it is intended that the scope of the invention be defined by the claims appended hereto, and their equivalents.

What is claimed is:

1. A method for routing information to a mobile device communicating with a wireless telecommunications network, said method comprising the steps of:
   receiving a call request for said mobile device from a device coupled to a packet-switched network at a first node of said wireless telecommunications network, said first node being coupled to said packet-switched network;
   sending an inquiry to a location resource of said wireless telecommunications network, said inquiry including a unique identifier of said mobile device;
   querying a database in said location resource using said unique identifier, said database including an association between said unique identifier and a serving node of said wireless telecommunications network in communication with said mobile device;
   sending a request for routing information from said location resource to said serving node of said wireless telecommunications network in communication with said mobile device;
   receiving a response to said request for routing information from said serving node;
   determining, using information contained in said response, if said serving node is also coupled to said packet-switched network;
   routing said call request from said first node to said serving node through a circuit-switched network coupled intermediate to said first node and said serving node in response to a negative indication that said serving node is coupled to said packet-switched network; and
   routing said call request through said packet-switched network to said serving node in response to an affirmative indication that said serving node is coupled to said packet-switched network, whereby said information can be routed from said first node to said serving node of said wireless telecommunications network without the use of said circuit-switched network.

2. The method recited in claim 1, wherein said inquiry further includes an indicator that said call request for said mobile device is from a device coupled to said packet-switched network.

3. The method recited in claim 2, wherein said request for routing information includes said indicator that said call request for said mobile device is from a device coupled to said packet-switched network.

4. The method recited in claim 1, wherein response to said request for routing information received from said serving node includes an address of said serving node on said packet-switched network.

5. The method recited in claim 1, wherein response to said request for routing information received from said serving includes a unique address of said serving node on said wireless telecommunications network.

6. The method recited in claim 5, wherein said step of determining if said serving node is coupled to said packet-switched network further comprises the step of querying a database using said unique address of said serving node on said wireless telecommunications network, said query returning an address of said serving node on said packet-switched if said serving node is coupled to said packet-switched network.

7. A system for routing information to a mobile device communicating with a wireless telecommunications network, said system comprising:
   means for receiving a call request for said mobile device from a device coupled to a packet-switched network at a first node of said wireless telecommunications network, said first node being coupled to said packet-switched network;
   means for sending an inquiry to a location resource of said wireless telecommunications network, said inquiry including a unique identifier of said mobile device;
   means for querying a database in said location resource using said unique identifier, said database including an association between said unique identifier and a serving node of said wireless telecommunications network in communication with said mobile device;
   means for sending a request for routing information from said location resource to said serving node of said wireless telecommunications network in communication with said mobile device;
   means for receiving a response to said request for routing information from said serving node;
   means for determining, using information contained in said response, if said serving node is also coupled to said packet-switched network;
   means for routing said call request from said first node to said serving node through a circuit-switched network coupled intermediate to said first node and said serving node in response to a negative indication that said serving node is coupled to said packet-switched network; and
   means for routing said call request through said packet-switched network to said serving node in response to an affirmative indication that said serving node is coupled to said packet-switched network, whereby said information can be routed from said first node to said serving node of said wireless telecommunications network without the use of said circuit-switched network.

8. The system recited in claim 7, wherein said inquiry includes an indicator that said call request for said mobile device is from said device coupled to said packet-switched network.

9. The system recited in claim 8, wherein said request for routing information includes said indicator that said call request for said mobile device is from said device coupled to said packet-switched network.

10. The system recited in claim 9, wherein said response to said request for routing includes an address of said serving node on said packet-switched network.

11. The system recited in claim 7, wherein said response to said request for routing information received from said serving node includes a unique address of said serving node on said wireless telecommunications network.

12. The system recited in claim 11, wherein said means for determining if said serving node is coupled to said packet-switched network further comprises means for querying a database using said unique address of said serving node on said wireless telecommunications network, said query returning an address of said serving node on said packet-switched if said serving node is coupled to said packet-switched network.

13. An apparatus for controlling the routing of information to a mobile device communicating with a wireless telecommunications network, said apparatus comprising:

means for receiving a call request for said mobile device from a device coupled to a packet-switched network at a first node of said wireless telecommunications network, said first node being coupled to said packet-switched network;

means for sending an inquiry to a location resource of said wireless telecommunications network, said inquiry including a unique identifier of said mobile device;

means for receiving a response to said inquiry, said response including a unique address of a serving node on said wireless telecommunications network in communication with said mobile device;

means for querying a database using said unique address of said serving node an said wireless telecommunications network, said query returning an address of said serving node on said packet-switched network if said serving node is coupled to said packet-switched network;

means for routing said call request from said first node to said serving node through a circuit-switched network coupled intermediate to said first node and said serving node in response to a negative indication that said serving node is coupled to said packet-switched network; and means for routing said call request through said packet-switched network to said serving node in response to an affirmative indication that said serving node is coupled to said packet-switched network, whereby said information can be routed from said first node to said serving node of said wireless telecommunications network without the use of said circuit-switched network.

14. The apparatus recited in claim 13, wherein said apparatus comprises a Gateway Mobile-Services Switching Center (GMSC).

15. The apparatus recited in claim 13, wherein said packet-switched network comprises the Internet.

16. The apparatus recited in claim 15, wherein said address of said serving node on said packet-switched network comprises an Internet Protocol (IP) address.

17. The apparatus recited in claim 13, wherein said circuit-switched network comprises a Public Switched Telephone Network (PSTN).

18. The apparatus recited in claim 13, wherein said serving node comprises a Mobile-Services Switching Center (MSC).

19. An apparatus for controlling the routing of information to a mobile device communicating with a wireless telecommunications network, said apparatus comprising:

means for receiving an inquiry from a first node of said wireless telecommunications network, said first node being coupled to a packet-switched network, said inquiry including a unique identifier of said mobile device and an indicator that a call request for said mobile device is from a device coupled to said packet-switched network;

means for querying a database using said unique identifier of said mobile device, said database including an association between said unique identifier and a serving node of said wireless telecommunications network in communication with said mobile device;

means for sending a request for routing information to said serving node of said wireless telecommunications network in communication with said mobile device, said request for routing information including an indicator that said call request for said mobile device is from said device coupled to said packet-switched network;

means for receiving a response to said request for routing information from said serving node, said response to said request including an address of said serving node on said packet-switched network if said serving node is coupled to said packet-switched network; and means for sending a response to said inquiry to said first node of said wireless telecommunications network, said response to said inquiry including said address of said serving node on said packet-switched network if said serving node is coupled to said packet-switched network.

20. The apparatus recited in claim 19, wherein said apparatus comprises a Home Location Resource (HLR).

21. The apparatus recited in claim 19, wherein said packet-switched network comprises the Internet.

22. The apparatus recited in claim 21, wherein said address of said serving node on said packet-switched network comprises an Internet Protocol (IP) address.

23. The apparatus recited in claim 19, wherein said response to said request for routing information from said serving node further includes an address of said serving node on a circuit-switched network coupled intermediate to said first node and said serving.

24. The apparatus recited in claim 23, wherein said circuit-switched network comprises a Public Switched Telephone Network (PSTN).

25. The apparatus recited in claim 19, wherein said first node of said wireless telecommunications network comprises a Gateway Mobile-Services Switching Center (GMSC).

26. The apparatus recited in claim 19, wherein said serving node of said wireless telecommunications network in communication with said mobile device comprises a Mobile-Services Switching Center (MSC).

* * * * *